E. STEIGER.
SOUND RECORDER AND REPRODUCER.
APPLICATION FILED JULY 15, 1919.

1,350,246.

Patented Aug. 17, 1920.

Inventor
Eugen Steiger

By Mason Fenwick Lawrence,
Attorneys

UNITED STATES PATENT OFFICE.

EUGEN STEIGER, OF ZURICH, SWITZERLAND.

SOUND RECORDER AND REPRODUCER.

1,350,246.  Specification of Letters Patent. Patented Aug. 17, 1920.

Application filed July 15, 1919. Serial No. 311,058.

*To all whom it may concern:*

Be it known that I, EUGEN STEIGER, a citizen of the Republic of Switzerland, residing at 2 Kornhausstrasse, Zurich 6, Switzerland, have invented certain useful Improvements in Sound Recorders and Reproducers, of which the following is a specification.

This invention relates to sound recorders and reproducers and the object thereof is to provide a record which is very cheap as compared with phonograph cylinder records and gramaphone disk records, and which takes up a minimum of space in storage or transmission in place of communication by letter, with particular advantage for secret transactions and transactions with the blind.

The invention also enables sound to be recorded or reproduced in a simple manner with the same device and without experience, practice or special preparations, or any substitution of parts. Moreover the device is very simple and cheap as compared with hitherto known talking machines and compares particularly favorably with the expensive dictating machines hitherto known, and forms a cheap phonograph of the kind which is within every one's reach and enables every one to produce their own records.

Figure 1:
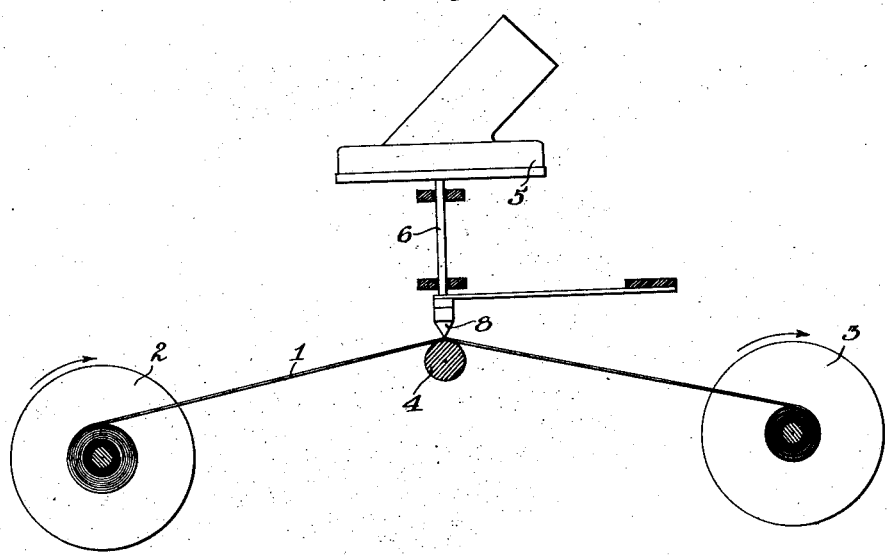
Figure 2:
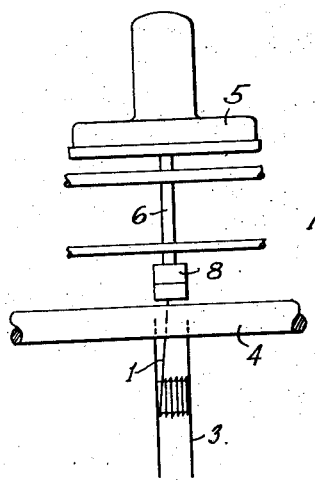

I attain these and other objects by the means illustrated diagrammatically in the accompanying drawing in which Figure 1 is a diagrammatic elevation with parts in section, and Fig. 2 is a partial elevation looking in a direction at right angles to Fig. 1.

1 is a structureless thread constituting a sound record carrier or phonogram tablet, which is wound on two rollers or bobbins 2, 3 and is laid over a support or abutment 4. The sound box 5 which is of the usual kind, has a pin 6 projecting from it and the pin 6 is formed at its free end with enlargement 8 flattened or beveled in a manner similar to a chisel which acts as recorder and reproducer stylus, and the rounded edge is situated above the support 4 upon which the thread forming the record, lies.

If a recording trumpet is placed on the sound box and sound is directed into the same, the diaphragm vibrates in the known manner and the pin 6 moves with it and makes in the thread 1 (record) impressions corresponding with the sound waves by means of the edge of the stylus or recording member, so long as the thread is caused to travel beneath the edge of the enlargement 8 of the pin 6 by rotation of the rollers 2, 3 for example in the direction of the arrows. Thus the recording of sounds is effected.

By using the term "impressions," I desire to emphasize the fact that the chisel edged stylus or recording member does not cut into the thread or remove portions thereof, but simply by its pressure produces in the surface of the thread irregularities corresponding to the vibrations of the recording member.

When it is desired to reproduce the recorded sounds, the thread (record) is returned to its initial position by correspondingly turning the rollers in reverse direction, and the thread is then traveled beneath the enlargement again in the same direction as when recording, whereby the sound waves are reproduced by the pin and the diaphragm. Thus the sounds are reproduced and can be made audible by an ear attachment or a sound trumpet placed on the sound box.

The thread 1, being structureless, has no tendency to twist, hence the same side of the thread will always face outward, both during recording and during reproduction. By spooling the thread in the manner described above, I preserve the proper position of its record face. Obviously, if the thread, before the record is impressed thereon as described, had irregularities such as result from uneven diameter or rough surface, this would not only interfere with efficient recording, but would, during reproduction, produce disturbing periods of silence, and again, foreign noises which would render the true sounds of the record indistinguishable. The thread, therefore, should have a substantially uniform diameter and a smooth surface.

As illustrated in Fig. 2, the stylus or recorder and reproducer member has a substantially straight, unbroken, operative edge transverse to the thread and tangential to the circumference of a cross-section of the thread. The recorder and reproducer member will, therefore, engage the thread practically at one point, and any lateral shifting of the recorder and reproducer will not destroy its proper operative relation to the thread, nor will there be any friction on the sides of the thread.

What I claim is:

1. A sound recording or reproducing apparatus comprising a structureless thread adapted to receive a sound record.

2. A sound record carrier, consisting of a structureless thread, bearing a sound record.

3. A sound record carrier, consisting of a thread having successive impressions therein forming a sound record.

4. A process of producing a sound record carrier which consists in applying a sound record on a structureless thread.

5. A process of producing a sound record carrier which consists in impressing a record of sound vibrations on a thread-like body.

6. A sound recording or reproducing apparatus comprising a stylus having a straight unbroken operative edge, means for effecting a relative movement between a thread-like body, adapted to receive a sound record, and said stylus, lengthwise of the thread-like body and transverse of the edge of the stylus.

7. In a sound recorder or reproducer, a structureless thread, constituting a sound record carrier, an abutment in contact with which said thread is guided, a diaphragm, a sound recording and reproducing member arranged to engage the thread on the opposite side to that which is adapted to engage said abutment and operatively connected to the diaphragm, said member being vibrated by the diaphragm when recording and vibrating said diaphragm when reproducing.

8. A process of recording sound, which consists in causing a structureles, twistless thread to unwind from one spool and, at the same time, wind on another spool, impressing a record of sound vibrations on that portion of the thread which is between the two spools, then winding the thread back upon the spool from which it was taken originally, thereby bringing it into condition to be operated for purposes of reproducing.

Signed at Zurich, Switzerland, this 6th day of June, 1919.

EUGEN STEIGER.

Witnesses:
  R. EICHHOFER,
  F. LAUCUCE.